INVENTORS
GEORGE H. ZENNER
EDWARD F. YENDALL 3,109,721
METHOD AND APPARATUS FOR SEPARATING A FLUID MIXTURE BY SONIC ENERGY
George H. Zenner and Edward F. Yendall, Kenmore, N.Y., assignors to Union Carbide Corporation, a corporation of New York
Filed Nov. 21, 1958, Ser. No. 775,508
26 Claims. (Cl. 55—15)

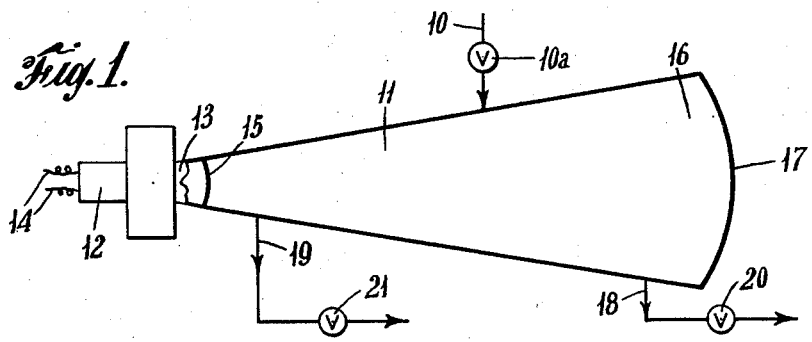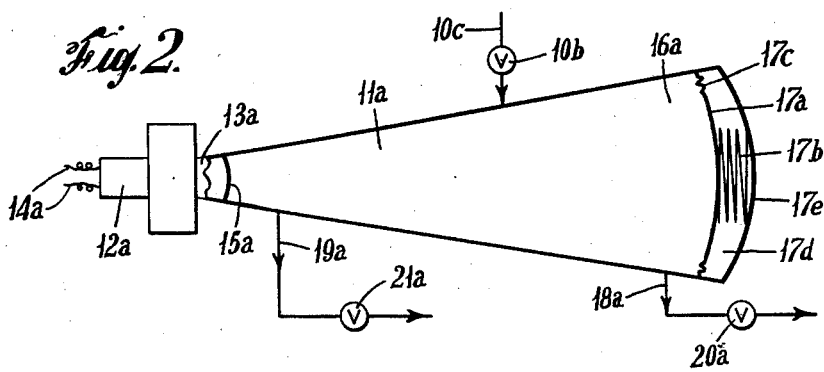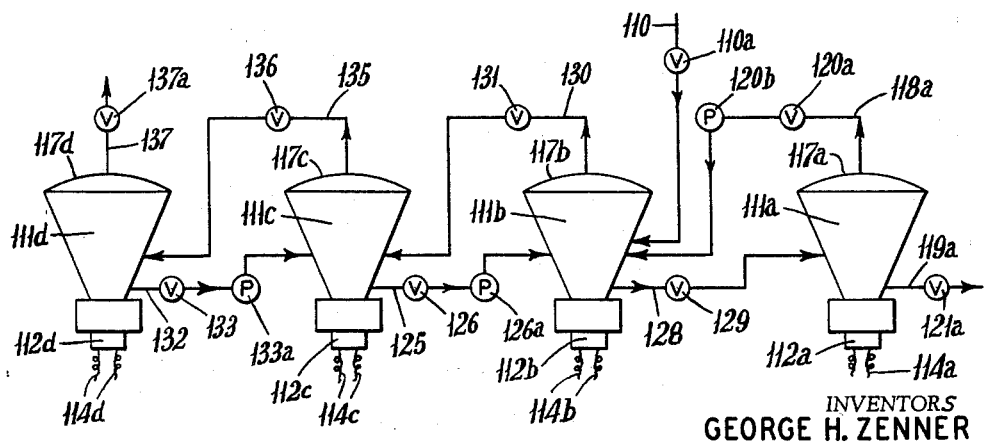

This invention relates to a method of and apparatus for separating a multi-component fluid mixture into heavier and lighter component enriched fractions by means of sonic energy.

Fluid separation takes place to a small degree in many energy fields. For example, the heavy molecules of the air tend to fall in the gravity field and displace lighter molecules upward. An equilibrium condition is reached when a work balance is established between the loss of potential gravitational energy and the increase of separation energy. This equilibrium represents an overall minimum in the total of potential gravitational energy and gas separation energy. Thus, there is a larger mole fraction of helium in the atmosphere at 20,000 ft. than at sea level. Similarly in a centrifuge operating at a given speed, at equilibrium there is a minimum in the total of the potential centrifugal and the separation energies.

Present methods of separating fluid mixtures, e.g. isotopes, may be divided into equilibrium processes and irreversible processes depending on either mass ratio or mass difference. Distillation is an equilibrium type process depending on mass ratio and is effective for light isotopes but not heavy isotopes. Centrifugation is an equilibrium type process depending on mass difference and should be effective for heavy isotopes. However, the cost of centrifuges is high and bearing friction uses power far in excess of the process itself. Irreversible processes such as thermal and barrier diffusion also have high power costs.

Sonic separation as taught in this invention belongs in the same group with centrifugation; it is an equilibrium process depending on mass difference and should be effective for heavy isotopes. Thus, it appears that sonic energy could represent a considerable improvement over other methods of isotope separation. Gas separation by sonic energy has heretofore been proposed, but previous experimental results have not been sufficiently attractive to stimulate commercial use. For example, in one prior art system, slight separation of a hydrogen-carbon dioxide mixture was obtained with a very large power consumption in a traveling sound wave established in a quartz and steel sandwich-type assembly. In another prior art system, a tube was sealed off with a flat glass plate at one end and fitted with a speaker motor at the other. Gas feed points were located at interemdiate points and gas was withdrawn at each end. A 50–50 mixture of helium and oxygen was introduced, and a very slight change in concentration was obtained at each end. Unfortuniately, the degree of separation was too small relative to the power consumption, for commercial use.

It is therefore a principal object of the present invention to provide an improved method and apparatus for separating fluid mixtures such as isotopes which cannot be economically separated by other methods.

A further object of the invention is to provide an improved method and apparatus for separating fluid mixtures by means of sonic energy.

A still further object is to provide an improvement in the separation of fluid mixtures by sonic energy, whereby a greater degree of separation is obtainable, and whereby the separation efficiency relative to power consumption is increased.

Other objects and advantages of the invention will become apparent as the description proceeds in connection with the accompanying drawings, in which:

FIG. 1 is a schematic diagram of a single-stage system for sonic separation of fluid mixtures according to the invention;

FIG. 2 is a schematic diagram of a sonic separation system similar to FIG. 1, but incorporating regeneration instead of reflection means for intercepting and returning the sonic waves to such system;

FIG. 3 is a schematic diagram of another sonic separation system similar to FIG. 1, but incorporating several stages of separation;

In the drawings, similar items of apparatus in the several figures are designated by similar reference characters.

Figure 4:
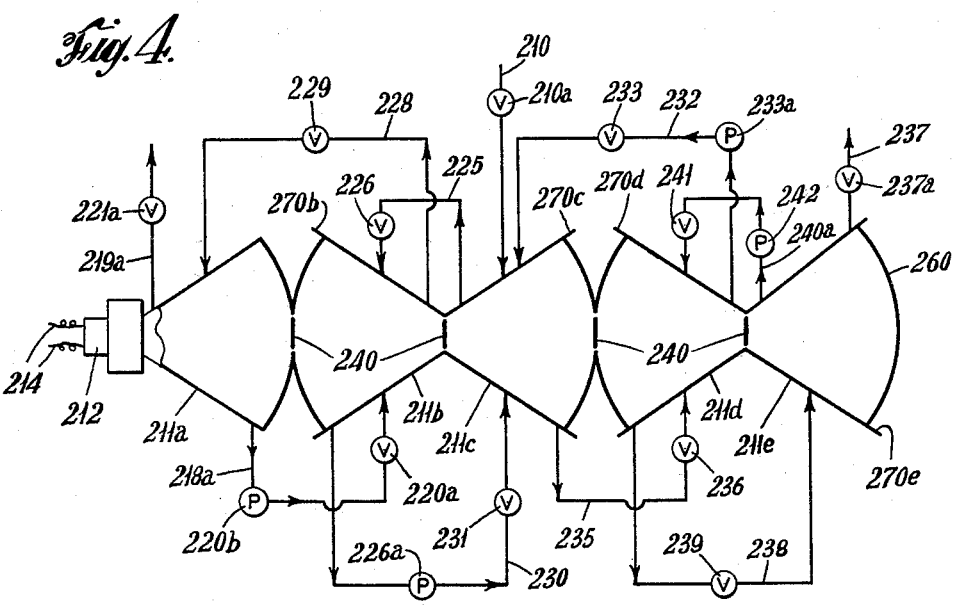
FIG. 4 is a schematic diagram of a modified staged sonic separation system.

According to the invention, it has been discovered that a multi-component fluid mixture may be separated into at least one heavier component enriched fraction and at least one lighter component enriched fraction by continuously introducing sonic energy to a zone of divergent cross-sectional area so as to establish sonic waves having energy gradients, and introducing the multi-component fluid mixture into the zone. The heavier component enriched fraction is concentrated in a first section of the zone where the cross-sectional area is relatively large (hereinafter called the "mouth") and where the sonic energy concentration is relatively low, and the lighter component enriched fraction is concentrated in a second section of the zone where the cross-sectional area is relatively small (hereinafter called the "throat") and where the sonic energy concentration is relatively high.

Best efficiency is obtained by conserving the sonic energy in the process. Unlike ordinary acoustical systems, the sonic energy is not permitted to dissipate as at the mouth of a horn, but is preferably intercepted and returned to the system, e.g., by reflection or regeneration in a zone section of component concentration, for example at each terminus mouth or throat of the sonic system where the energy would otherwise escape.

The sonic energy of a given fluid volume depends on the product of the fluid density and the square of the sonic displacement amplitude, the fluid density factor being common to gravitational and centrifugal separations. The square of the sonic displacement amplitude denotes the strength of the field and is similar to the gravitational or centrifugal force in its influence on the potential energy of the system although it lacks the directional property of a force. However, when a sonic wave front spreads, the amplitude of the wave becomes smaller and this change in energy per unit volume gives an energy density difference which can be viewed as a possible driving force for fluid separation.

Physically, the aforementioned separation may be accomplished in a divergent channel such as a horn-shaped chamber with sonic energy generating means e.g., a driver, at one end. In a preferred embodiment, a spherical reflector of suitable radius is inserted at the other end of the chamber and a standing wave is used. In order to maintain the wave in this apparatus, it is necessary for the driver merely to supply sufficient power to replenish the friction losses in the system plus the theoretical reversible work required for fluid separation. The standing wave pattern can be obtained by adjusting the frequency and phase of the driver so that the resultant of the reflected and generated waves is a single reinforced wave. In this way, the total energy in the sound wave is efficiently maintained at a desired high value. If the driver operates at a non-resonant frequency, a loss of sonic energy is likely to occur depending upon the characteristics of the driving system. Therefore, the standing wave pattern is advantageous in conserving the sonic energy but is otherwise not essential. The taper or flare rate of the horn should preferably be low enough so that the sound waves traveling therein "cling" to the walls. This is readily achieved by designing the horn to have a flare cut-off frequency less than 50% of the frequency of the sound wave used for fluid separation.

Although fluid mixture separation is obtainable in single horns, the degree of enrichment is insufficient for most practical applications. The present invention obviates this limitation by providing a system of staged sonic separating zones which produce as end products, heavier and lighter component enriched fractions with a substantial degree of separation. In one staging method, the fluid mixture is fed into a first selected stage zone at a point of intermediate cross-sectional area for separation therein in the aforedescribed manner. A fraction enriched in the lighter component is withdrawn from the throat of the zone and is fed to a second stage zone at a point of intermediate cross-sectional area for further enrichment in the lighter component. A fraction enriched in the heavier component is withdrawn from the mouth of the first stage and is fed to a third stage zone at a point of intermediate cross-sectional area for further enrichment in the heavier component. A sufficient number of stages may be employed as required to achieve the desired degree of enrichment in the lighter and heavier fractions. The fractions withdrawn from each stage are in turn fed into other stages at zones where the compositions of the fluid in such stages approximately matches the composition of the feed fractions. Finally, a light product is withdrawn from the throat of one terminal stage and a heavier product is withdrawn from the mouth of the other terminal stage. Although various embodiments will be specifically described in terms of gas separation, it is contemplated that the present invention may be successfully utilized for the separation of liquids and perhaps for the separation of finely divided solids exhibiting fluid characteristics.

The present invention also provides a method of and apparatus for staging a plurality of communicating divergent sonic energy zones operating from a single sonic energy source. The method includes the steps of establishing a standing sonic wave in a first selected divergent sonic energy zone by the sonic energy source, tuning the remaining divergent zones to be in resonance with the standing wave and energizing each of the remaining divergent zones by the standing wave thereby establishing energy density gradients in each zone. The sonic energy traveling through such zones is conserved by intercepting and returning such energy to the zones at each terminus of the divergent zones.

Referring now to FIG. 1, a feed stream constituting, for example, a gas mixture is supplied to conduit 10 and passed through control valve 10a into horn-shaped channel 11 at an intermediate point thereof. A sound generator 12 is provided at the throat end 13 of the horn 11, with suitable electrical connections 14 to provide the necessary power. A diaphragm 15 is also provided across the throat end 13. The mouth end 16 is preferably closed by a spherical reflector 17, and heavy and light product discharge conduits 18 and 19 are provided at the mouth and throat ends, respectively, of the horn-shaped channel 11. The heavier component enriched fraction is withdrawn as a heavy product gas through conduit 18 and control valve 20 therein and the light component enriched fraction is withdrawn as a light product gas through conduit 19 and control valve 21. Spherical reflector 17 permits conserving sonic energy within horn 11 by intercepting the traveling waves reaching such reflector and returning them to the horn.

The present invention may be illustrated by the following successfully performed experiments: A conical horn about 7½ inches long was used, the horn having a throat diameter of 13/16 inch and a mouth diameter of 14 inches, the mouth being closed with a spherical segment having a radius of 10 inches. A driver unit activated by a variable frequency sound generator was placed in the throat end. The power input to the driver was 20 watts, and the latter was excited at a resonant frequency of 1380 cycles per second. Using a mixture of 47.14% oxygen and 52.9% helium feed gas at various feed rates and approximately equal rates of withdrawal of the light and heavy product streams, the following results were obtained:

| Feed Rate, cc./hr. | Percent Oxygen at Mouth Minus Percent Oxygen at Throat | Separation Factor |
| --- | --- | --- |
| 160 | 3.90 | 1.173 |
| 640 | 2.86 | 1.122 |
| 750 | 2.28 | 1.0961 |
| 1,380 | 2.00 | 1.083 |
| 1,750 | 1.63 | 1.069 |
| 2,640 | 1.30 | 1.054 |

On the basis of this data, the separation factor may be experimentally related to the feed rate by the equation:

$$\ln \alpha = 0.165 e^{-0.00051R}$$

where R is the feed rate in cc./hr., and e is the base of the natural logarithm. The separation factor $\alpha$ is defined by the equation:

$$\alpha = \left(\frac{y'}{x'}\right)\left(\frac{x''}{y''}\right)$$

where $x'$, $x''$ represent mol fractions of light and heavy components, respectively, in one product and $y'$, $y''$ represent mol fractions of light and heavy components, respectively, in the other product.

It is evident from these tests that higher separation factors are obtained at lower feed rates if all other conditions are maintained constant—i.e., frequency, energy input, and feed composition. Furthermore, the separation factors obtained during these tests are substantially higher than those reported in the prior art sonic separation systems. It was qualitatively observed during other tests using the same apparatus that at a particular feed rate and resonant frequency, the degree of separation increased with increasing power input to the driver. This was accomplished by varying the amplitude of the wave.

The power consumed in the above separation experiments is not to be considered optimum since the type of amplifier and driver used was designed for normal acoustic purposes such as for use as a public address system. For this service, it is customary to provide maximum damping so that the energy in the reflected wave is purposely damped out promptly. This improves clarity in music or speech reproduction but is completely wasteful of the power in the reflected wave. In a practical application for gas separation, the acoustical driver and its associated electrical circuits would be designed to maintain resonant conditions and not to quench them. In such a system, the driver might be said to absorb and then regenerate the sonic wave with maximum efficiency.

FIG. 2 illustrates another single-stage separating system similar to that of FIG. 1, except that the sonic energy reaching the mouth of the horn is intercepted and returned to the system by regeneration instead of reflection. This may be effected, for example, by an assembly including end wall 17a supported by spring 17b. The periphery of end wall 17a is joined to the mouth end of horn 11a by flexible ring 17c which is illustrated as a corrugated section of such end wall. Alternatively, a ring of elastic material such as foam rubber or plastic could be provided as flexible ring 17c. Zone 17d between end wall 17a and mouth end closure 17e is preferably as narrow as possible to minimize possible adverse effects of sonic waves in such zone. For this reason, end wall 17a and mouth end closure 17e are preferably concave to the horn-shaped channel 11a. The traveling sonic waves reaching mouth end wall 17a are absorbed and regenerated by the end wall-spring assembly; that is, sonic energy is transmitted by end wall 17a to spring 17b which is momentarily compressed by absorption of the energy. The spring then expands in a manner analogous to a piston and returns the sonic energy to the horn-shaped chamber 11a through end wall 17a, thereby regenerating such energy. Alternatively the energy may be absorbed and regenerated by an electrical circuit, e.g. by means of a device similar to sound generator 12a. Still another alternative is a combination of a reflector and a regenerator wherein a portion of the end wall is designed to reflect the energy while another portion is designed to regenerate the energy. When regeneration is used to intercept and conserve the energy, the regenerative device may, if desired, be connected to an outside source of power so that the latter assists in restoring the sonic energy losses in the system.

Referring now to the staging arrangement of FIG. 3, the gas mixture feed stream is supplied to conduit 110 and passes through control valve 110a into a selected feed stage channel 111b at an intermediate point thereof. Each of the four staged horn-shaped channels 111a–d shown in the drawing operates in the same manner as the single horn of FIG. 1, and each is provided with a separate sound generator 112a–d and spherical reflector 117a–d. A light component enriched gas fraction is discharged from the feed stage channel 111b through conduit 128 and control valve 129 therein, the heavy component enriched fraction is discharged into conduit 130 with control valve 131 therein. The latter stream is passed to a zone of intermediate cross sectional area in another stage channel 111c as feed gas therefor, the flow being regulated by control valve 131. The lighter component enriched fraction formed in the feed stage channel 111b and discharged through conduit 128 having control valve 129 therein is passed to a zone of intermediate cross sectional area in still another stage channel 111a as feed gas therefor.

The heavier component enriched gas fraction from feed stage chamber 111b is further separated in stage 111c into heavier and lighter fractions. The heavier gas fraction is withdrawn through conduit 135 and control valve 136 therein, and is passed to terminal stage 111d as feed gas therefor. The lighter fraction is withdrawn from stage 111c through conduit 125 and control valve 126 therein. In the preferred staged system the composition of the lighter gas fraction from stage 111c approximately matches the composition at an intermediate zone in stage 111b and is introduced into stage 111b as additional feed gas therefor. In terminal stage 111d, the heavier gas fraction from stage 111c is further separated into a heavy product gas and a lighter gas fraction. The heavy product gas is withdrawn through conduit 137 for use as desired. The lighter gas fraction withdrawn from terminal stage 111d through conduit 132 and valve 133 therein preferably has a composition which approximately matches a feed zone in stage 111c, so that it is introduced into stage 111c as additional feed gas therefor.

Thus stages 111c and 111d serve to further concentrate the heavier component in the heavier gas fraction withdrawn from feed stage 111b. Similarly, terminal stage 111a serves to further concentrate the lighter component in the lighter gas fraction from feed stage 111b. The lighter gas fraction removed from stage 111b is passed to stage 111a for further separation into a heavier gas fraction and a light product gas. The heavier fraction, having a composition which matches approximately the composition at the feed zone in stage 111b, is withdrawn through conduit 118a and valve 120a therein and is introduced into stage 111b as additional feed gas therefor. The light product gas is withdrawn through conduit 119a and valve 121a therein for use as desired.

Provision must be made for overcoming fluid friction and for producing the required fluid flows in the system. The initial feed fluid to be separated may be supplied under sufficient pressure in conduit 110 to induce flow through the system from the feed stage 111b toward each terminal stage 111a and 111d. For inducing fluid flows in the reverse direction, i.e., from the terminal stages toward the feed stage, blowers or pumps 120b, 126a and 133a may be provided in conduits 118a, 125 and 132, respectively. If such flow inducing devices are of the positive displacement or metering type, they may eliminate the need for control valves 120a, 126 and 133. Alternatively, the flow inducing devices may be placed in conduits 128, 130 and 135 and operated so that the stage pressures increase progressively from the feed stage 111b towards the terminal stages 111a and 111d. In such case, flow inducing devices may not be required in conduits 118a, 125 and 132.

Figure 5:
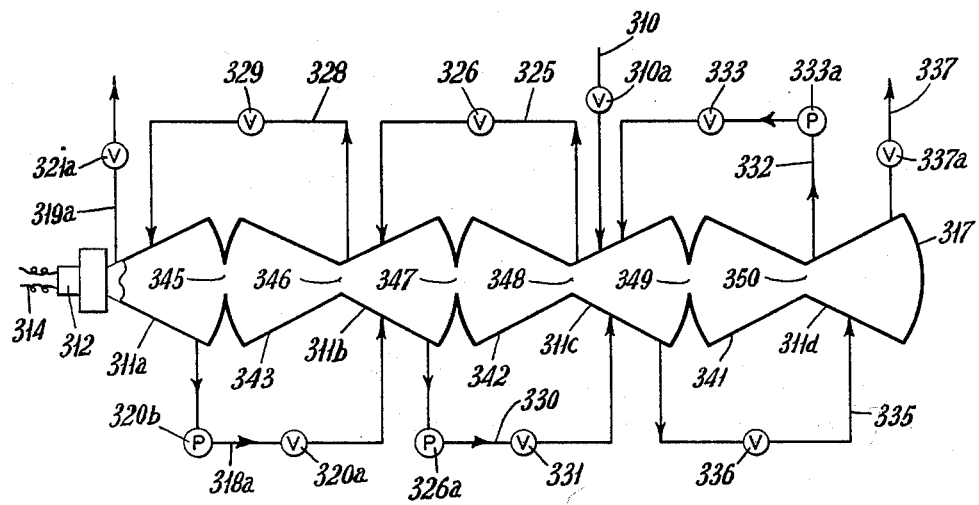
FIG. 5 is a schematic diagram of still another staged sonic separation system.

Although four stages of sonic separation are illustrated in FIGS. 3–5, it is to be understood that any desired number of stages may be used, and would operate in the aforedescribed manner. That is, the gas fed to any given stage includes the lighter component enriched fraction from one adjacent stage in the series and the heavier component enriched fraction from the other adjacent stage. The lighter component enriched fraction separated in each stage is discharged from the throat section and passed to one adjacent stage as feed gas, and the heavier component enriched fraction is discharged from the mouth section and passed to the other adjacent stage as feed gas. The feed gas to any stage is withdrawn as substantially equally divided product fractions, and the purity gain is approximately equal for adjacent stages; that is, one-half the concentration difference between the light and heavy products of the stage. The initial feed stage is also subject to choice and may be selected to suit the individual separation required.

Rather than excite each staged horn by means of a separate driver as shown in FIG. 3, it is contemplated that several horns may be coupled and excited with a single driver thereby reducing investment and power costs. Thus, multiple horns may be clustered about a single driver in a manner often employed for acoustical horns, or otherwise arranged in parallel with respect to a single sonic energy source.

Another method of coupling stages is to arrange the horns axially mouth-to-mouth and throat-to-throat. Referring to FIG. 4, the horns or channels are joined at zones where the pressure and wave displacement characteristics are similar; i.e., mouth-to-mouth and throat-to-throat. The feed gas to each stage is formed in the same manner as in FIG. 3, and the resulting heavier and lighter component enriched gas fractions are likewise processed as previously described with respect to the FIG. 3 staging system. A single sound generator 212 provides sufficient sound energy for the entire system by the use of diaphragms 240 as the sound energy transmitting means between adjacent stages. Such diaphragms 240 may be formed from flexible material such as rubber, or a plastic film such as polyethylene terephthalate (Mylar), and serve to transmit the sound energy from stage to stage with very little energy loss. Sound generator 212 is positioned in the throat end of terminal stage channel 211a and generates a sonic wave which is transmitted from stage to stage. The sonic energy is finally intercepted and returned to the system by reflector 260 provided at the mouth end of the other terminal stage channel 211e. The mouth-to-mouth and throat-to-throat arrangement is preferably used when coupling horns in axial alignment with a single driver in order that the sonic energy can be effectively transmitted from horn to horn. If a throat-to-mouth coupling arrangement were used, the average sonic density in each horn would decrease continuously as the horns become farther and farther displaced from the sound generator.

FIG. 4 also illustrates a method of and apparatus for staging a plurality of communicating divergent channels operating from a single sonic energy source. First, a standing sonic wave is established in one of the divergent channels, for example channel 211a. Next, the remaining communicating channels 211b–e are tuned to be in resonance with the standing wave. Tuning may, for example, be performed by adjusting the length of each channel 211b–e by means of channel wall extensions 270b at their respective mouths. Alternatively, tuning could be effected by providing means for adjusting the temperature in each channel. The tuned divergent channels are energized by the aforementioned standing sonic wave, thereby establishing energy density gradients in each channel. Finally, the sonic energy traveling through the channels is intercepted and returned to such channels at each terminus, or channel section blocking further longitudinal passage of such energy. In FIG. 4, only one terminus is provided, this, being the previously described diaphragm-spring assembly at the mouth of channel 211e. It is to be understood, however, that communicating divergent channels could be arranged so that multiple terminuses are provided.

The arrangement of FIG. 4 uses sound transmitting diaphragms to maintain purity differences between adjacent zones in coupled horns. FIG. 5 illustrates an alternative embodiment wherein the diaphragms are replaced by "inactive" or buffer horns 341, 342 and 343. The buffer horns are interposed between active horns 311a–d and are excited in the same manner as the active stages. The buffer horns utilize their capacity to separate fluids merely to maintain a purity difference between the open connections into adjacent active stages. Since the buffer stages have no throughput, i.e., they have neither feed or withdrawal points, they are capable of maintaining an appreciably greater purity difference between mouth and throat than is possible in the active stages. Thus, the arrangement of FIG. 5 represents a simplification by eliminating the need for diaphragms. The horns are placed mouth-to-mouth and thoat-to-throat, with the buffer horns interposed therebetween and connecting the active stages. The sonic waves established by means of sound generator 312 in terminal stage 311a are diffused and passed through opening 345 connecting the mouth of active horn 311a with the mouth of buffer horn 343 into the latter horn where they are reconcentrated and passed through opening 346 connecting the throat of buffer horn 343 with the throat of active horn 311b. In the active stage 311b, the wave amplitudes increase, are passed through opening 347 and reconcentrated in buffer horn 342 for passage through opening 348 to the active stage 311b for expansion therein. The sonic waves pass through opening 349, then again reconcentrated in buffer 341 for passage through opening 350 and diffusion in terminal active stage 311d. The waves reaching the mouth of the latter stage are reflected by spherical reflector 317 and returned through the various stages towards the sound generator 312 so as to augment the already established waves. The feed and separation gas conduits of active stages 311a–d are arranged in a manner similar to the stages of FIGS. 3 and 4.

Although preferred embodiments of the invention have been described in detail, it is contemplated that modifications of the method and apparatus may be made and that some features may be employed without others, all within the spirit and scope of the invention. For example, the horns could be turned around so that the sound generators supply sonic energy at the mouth end instead of the throat end. In this case, the spherical reflector would be at the throat end, but the system would operate in the previously described manner with the light and heavy fractions being withdrawn at the throat and mouth, respectively. An advantage of such an arrangement is the use of a smaller spherical reflector, and a disadvantage is the requirement of a larger enclosure for the sound generator. Another alternative is the use of traveling instead of standing waves in the horns. The most important disadvantage of this arrangement would be higher power costs. This is because the sound generator must continuously supply the power necessary for acceleration and compression of the waves, since on leaving the generator they traverse to the opposite end of the horn and are not returned.

Although a conical horn shape was used in the afore-described experiments, the exponential horn or other standard acoustical shapes would also be suitable. Similarly, the reflector may be of other than spherical shape.

What is claimed is:

1. A method for separating a multi-component fluid mixture into at least one heavier component enriched fraction and at least one lighter component enriched fraction, including the steps of continuously intoducing sonic energy to a zone of divergent cross-sectional area so as to establish sonic waves having energy density gradients, introducing said multi-component fluid mixture into said zone, concentrating said heavier component enriched fraction in a first mouth section of said zone where the cross-sectional area is relatively large and the sonic energy concentration is relatively low, and concentrating said lighter component enriched fraction in a second throat section of said zone where the cross-sectional area is relatively small and the sonic energy concentration is relatively high, and withdrawing the concentrated heavier component enriched fracton and the concentrated lighter component enriched fraction from said zone.

2. A method according to claim 1 for separating a multi-component fluid mixture, in which said sonic energy is introduced at a resonant frequency.

3. A method according to claim 1 for separating a multi-component gas mixture in which said sonic energy is conserved within said zone.

4. A method according to claim 1 for separating a multi-component fluid, in which the sonic waves traveling through said zone are intercepted and returned to said zone thereby conserving the sonic energy in the zone.

5. A method according to claim 4 for separating a multi-component fluid, in which interception and return of the sonic waves to the zone is effected by reflecting such waves in a zone section of component concentration.

6. A method according to claim 4 for separating a multi-component fluid, in which interception and return of the sonic waves to the zone is effected by absorbing and regenerating such waves in a zone section of component concentration.

7. A method for separating a multi-component fluid mixture into at least one heavier component enriched fraction and at least one lighter component enriched fraction including the steps of continuously introducing sonic energy to a plurality of staged zones each of divergent cross-sectional area so as to establish therein sonic waves having energy gradients, introducing said multi-component fluid mixture into a first selected stage zone, concentrating said heavier component enriched fraction in a mouth section of said zone where the cross-sectional area is relatively large and the sonic energy concentration is relatively low, concentrating said lighter component enriched fraction in a throat section of said zone where the cross-sectional area is relatively small and the sonic energy concentration is relatively high, withdrawing the lighter fraction from the first stage and passing such fraction as feed fluid to an intermediate section of a second stage sonic energy zone operating in the same manner as said first stage, withdrawing said heavier component enriched fraction from the first stage and passing such fraction as feed gas to an intermediate section of a third stage sonic energy zone also operating in the same manner as said first stage, further concentrating said lighter and heavier components in said second and third stage sonic energy zones, respectively, withdrawing a lighter component enriched fraction from the throat of said second stage sonic energy zone, and withdrawing a heavier component enriched fraction from the mouth of said third stage sonic energy zone.

8. A method according to claim 7 for separating a multi-component fluid mixture into at least one heavier component enriched fraction and at least one lighter component enriched fraction, in which said sonic energy is introduced at a resonant frequency and said sonic waves traveling through said series of staged zones are intercepted and returned through such zones thereby conserving the sonic energy in the zones.

9. A method according to claim 7 for separating a multi-component fluid mixture into at least one heavier component enriched fraction and at least one lighter component enriched fraction, in which a heavier component enriched fraction is withdrawn from the mouth section of said second stage sonic energy zone and passed to the first stage zone as feed gas therefor, and a lighter component enriched fraction is withdrawn from the throat section of said third stage sonic energy zone and passed to the first stage zone as additional feed gas therefor.

10. A method according to claim 7 for separating a multi-component fluid mixture into at least one heavier component enriched fraction and at least one lighter component enriched fraction, in which buffer stages of divergent cross-sectional area are interposed between the first and second, and first and third active sonic energy stages so that the sonic waves are passed from stage to stage through the smallest cross-sectional area throat portions and the largest cross-sectional area mouth portions, respectively, of adjacent stages.

11. A method of staging a plurality of divergent sonic energy zones, operating from a single sonic energy source comprising the steps of establishing a standing sonic wave in a first selected divergent sonic energy zone by said single sonic energy source, tuning the remaining divergent zones to be in resonance with said standing wave, energizing each of said remaining divergent zones by said standing wave and establishing energy density gradients in each zone, and conserving the sonic energy traveling through such zones by intercepting and returning said sonic energy to the zones at each terminus of the divergent zones.

12. A method according to claim 11 of staging a plurality of communicating divergent sonic energy zones operating from a single sonic energy source, in which said sonic energy is intercepted and returned to the zones by reflection.

13. A method according to claim 11 of staging a plurality of communicating divergent sonic energy zones operating from a single sonic energy source, in which said sonic energy is intercepted and returned to the zones by absorption and regeneration.

14. Apparatus for separating a multi-component fluid mixture into at least one heavier component enriched fraction and at least one lighter component enriched fraction including a divergent channel of constantly changing cross-sectional area, means for generating sonic energy in such channel to establish sonic waves therein having energy gradients, means for introducing said multicomponent fluid mixture into said channel so as to concentrate said heavier component enriched fraction in the mouth of said channel where the cross-sectional area is relatively large and the sonic energy concentration is relatively low, and to concentrate said lighter component enriched fraction in the throat of said channel where the cross-sectional area is relatively small and the sonic energy concentration is relatively high, and means for withdrawing the concentrated heavier component enriched fraction and the concentrated lighter component enriched fraction from said divergent channel.

15. Apparatus according to claim 14 for separating a multi-component fluid mixture, including means for generating sonic energy at a resonant frequency and means for intercepting and returning said sonic waves to said channel.

16. Apparatus for separating a multi-component fluid mixture into at least one heavier component enriched fraction and at least one lighter component enriched fraction, including a plurality of staged divergent channels of constantly changing cross-sectional area; means for generating sonic energy to establish sonic waves having energy gradients in such channels; means for introducing said multicomponent fluid mixture into a first selected stage channel to concentrate said heavier component enriched fraction in the mouth of such channel where the cross-sectional area is relatively large and the sonic energy concentration is relatively low, and to concentrate said lighter component enriched fraction in the throat of said first selected stage channel where the cross-sectional area is relatively small and the sonic energy concentration is relatively high; means for withdrawing the lighter fraction and passing such fraction as feed gas to an intermediate section of a second stage divergent channel; means for withdrawing said heavier component enriched fraction from the first stage channel and passing such fraction as feed gas to an intermediate section of a third stage diverging channel also operating in the same manner as the first stage channel; means for withdrawing a lighter component enriched fraction from the throat of said second stage divergent channel; and means for withdrawing a heavier component enriched fraction from the mouth of said third stage divergent channel.

17. Apparatus according to claim 16 for separating a multi-component fluid mixture into at least one heavier component enriched fraction and at least one lighter component enriched fraction in which buffer divergent channels are interposed between the first and second, and the first and third active stage channels with throats of adjacent diverging channels communicating with each other and the mouths of adjacent diverging channels communicating with each other.

18. Apparatus according to claim 14 for separating a multi-component fluid mixture in which said divergent channel of constantly changing cross-sectional area is a conical horn shape.

19. Apparatus for staging a plurality of communicating divergent sonic energy channels of constantly changing cross-sectional area operating from a single means for generating sonic energy, comprising means for tuning the remaining divergent channels to be in resonance with a standing sonic wave previously established in a first selected divergent sonic energy channel, and means for intercepting and returning sonic energy traveling through such divergent channels and reaching each terminus of the channels, thereby conserving said sonic energy.

20. Apparatus according to claim 19 for staging a plurality of communicating divergent sonic energy channels, in which reflectors comprise said means for intercepting and returning sonic energy to the divergent channels.

21. Apparatus according to claim 19 for staging a plurality of communicating divergent sonic energy channels, in which absorber-regenerators comprise said means for intercepting and returning sonic energy to the divergent channels.

22. Apparatus according to claim 16 for separating a multi-component fluid mixture into at least one heavier component enriched fraction and at least one lighter component enriched fraction, including means for withdrawing a heavier component enriched fraction from the mouth of the second stage divergent channel and passing such fraction to the first stage diverging channel as feed gas therefor, and means for withdrawing a lighter component enriched fraction from the throat of the third stage divergent channel and passing such fraction to the first stage channel as additional feed gas therefor.

23. A method according to claim 7 for separating a multi-component fluid mixture into at least one heavier component enriched fraction and at least one lighter component enriched fraction, in which said sonic waves are transmitted between at least two adjacent stages through the smallest cross-sectional area portions thereof.

24. A method according to claim 7 for separating a multi-component fluid mixture into at least one heavier component enriched fraction and at least one lighter component enriched fraction, in which said sonic waves are transmitted between at least two adjacent stages through the largest cross-sectional portions thereof.

25. Apparatus according to claim 16 for separating a multi-component fluid mixture into at least one heavier component enriched fraction and at least one lighter component enriched fraction, in which the throat of said first selected stage channel communicates with the throat of at least one adjacent stage channel through sonic wave transmitting means.

26. Apparatus according to claim 16 for separating a multi-component fluid mixture into at least one heavier component enriched fraction and at least one lighter component enriched fraction, in which the mouth of said first selected stage channel communicates with the mouth of at least one adjacent stage channel through sonic wave transmitting means.

References Cited in the file of this patent

UNITED STATES PATENTS

| | | |
|---|---|---|
| 2,049,766 | Glen | Aug. 4, 1936 |
| 2,300,761 | Amy | Nov. 3, 1942 |
| 2,414,495 | Vang | Jan. 21, 1947 |
| 2,448,372 | Horsley | Aug. 31, 1948 |
| 2,532,554 | Joeck | Dec. 5, 1950 |
| 2,672,590 | McSkimin | Mar. 16, 1954 |
| 2,763,333 | Schumann | Sept. 18, 1956 |
| 2,949,166 | Coleman et al. | Aug. 16, 1960 |